US012008807B2

(12) United States Patent
Smith

(10) Patent No.: US 12,008,807 B2
(45) Date of Patent: Jun. 11, 2024

(54) SYSTEM AND METHODS FOR EARLY DETECTION OF NON-BIOLOGICAL MOBILE AERIAL TARGET

(71) Applicant: Sarcos Corp., Salt Lake City, UT (US)

(72) Inventor: Fraser M. Smith, Salt Lake City, UT (US)

(73) Assignee: Sarcos Corp., Salt Lake City, UT (US)

( * ) Notice: Subject to any disclaimer, the term of this patent is extended or adjusted under 35 U.S.C. 154(b) by 334 days.

(21) Appl. No.: 17/220,832

(22) Filed: Apr. 1, 2021

(65) Prior Publication Data
US 2021/0312640 A1     Oct. 7, 2021

Related U.S. Application Data

(60) Provisional application No. 63/003,711, filed on Apr. 1, 2020.

(51) Int. Cl.
G06V 20/17     (2022.01)
G06T 7/11      (2017.01)
G06T 7/215     (2017.01)
G06V 10/62     (2022.01)

(52) U.S. Cl.
CPC ............... *G06V 20/17* (2022.01); *G06T 7/11* (2017.01); *G06T 7/215* (2017.01); *G06V 10/62* (2022.01); *G06T 2207/30181* (2013.01); *G06T 2207/30248* (2013.01)

(58) Field of Classification Search
CPC .... G06V 20/17; G06V 10/62; G06V 2201/07; G06T 7/11; G06T 7/215; G06T 2207/30181; G06T 2207/30248
See application file for complete search history.

(56) References Cited

U.S. PATENT DOCUMENTS

| 4,240,601 | A  | 12/1980 | Reed |
| 4,600,016 | A  | 7/1986  | Boyd et al. |
| 4,653,498 | A  | 3/1987  | New, Jr. et al. |
| 5,882,931 | A  | 3/1999  | Petersen |
| 6,119,976 | A  | 9/2000  | Rogers |
| 6,392,213 | B1 | 5/2002  | Martorana et al. |

(Continued)

FOREIGN PATENT DOCUMENTS

| CN | 105654500 A | * | 6/2016 |
| CN | 107792381 A |   | 3/2018 |

(Continued)

OTHER PUBLICATIONS

Zang et al. "Developing a spectral angle based vegetation index for detecting the early dying process of Chinese fir trees" ISPRS Journal of Photogrammetry and Remote Sensing 171 (2021), Dec. 7, 2019 pp. 253-265.*

(Continued)

*Primary Examiner* — Mia M Thomas

(57) ABSTRACT

Systems and methods are disclosed for scanning a predetermined area of an aerial landscape with one or more cameras for an airborne target and capturing a plurality of images of the airborne target with the one or more cameras, the one or more cameras in communication with a processor. Microscopic temporal variations between the plurality of images of the airborne target are amplified including a change in the geometry of a two-dimensional image of the airborne target.

32 Claims, 5 Drawing Sheets

(56) References Cited

U.S. PATENT DOCUMENTS

| | | | |
|---|---|---|---|
| 7,365,839 B2 | 4/2008 | Ferguson et al. | |
| 7,769,226 B2 | 8/2010 | Oguni et al. | |
| 8,146,855 B2 | 4/2012 | Ismailov | |
| 8,179,418 B2 | 5/2012 | Wright et al. | |
| 9,085,362 B1 | 7/2015 | Kilian et al. | |
| 9,789,950 B1 | 10/2017 | Most et al. | |
| 9,913,583 B2 | 3/2018 | Smith, Sr. | |
| 10,040,554 B1 | 8/2018 | Weinstein et al. | |
| 10,217,243 B2* | 2/2019 | Pham | G06V 10/751 |
| 10,349,893 B2 | 7/2019 | Lee et al. | |
| 10,364,026 B1 | 7/2019 | Hanlon et al. | |
| 10,384,772 B2 | 8/2019 | Yamada et al. | |
| 10,470,670 B2 | 11/2019 | Smith | |
| 10,663,266 B2 | 5/2020 | Banga et al. | |
| 10,689,109 B2 | 6/2020 | Wypyszynski et al. | |
| 10,910,106 B2 | 2/2021 | Deterding et al. | |
| 10,926,875 B2 | 2/2021 | Klein | |
| 10,997,421 B2* | 5/2021 | Khosla | G06V 20/52 |
| 11,154,249 B2 | 10/2021 | Kuhn et al. | |
| 11,192,646 B2 | 12/2021 | Smith et al. | |
| 11,440,656 B2 | 9/2022 | Smith et al. | |
| 11,462,322 B1 | 10/2022 | Cuthbert et al. | |
| 11,465,741 B2 | 10/2022 | Smith et al. | |
| 11,472,550 B2 | 10/2022 | Smith et al. | |
| 11,673,664 B2 | 6/2023 | Smith et al. | |
| 11,697,497 B2 | 7/2023 | Smith et al. | |
| 2003/0112921 A1 | 6/2003 | Lang et al. | |
| 2004/0008219 A1 | 1/2004 | Sarel | |
| 2006/0044406 A1 | 3/2006 | Swarr et al. | |
| 2006/0127071 A1 | 6/2006 | Takeuchi et al. | |
| 2007/0004970 A1 | 1/2007 | Tice | |
| 2007/0249952 A1 | 10/2007 | Rubin et al. | |
| 2007/0293781 A1 | 12/2007 | Sims et al. | |
| 2007/0299477 A1 | 12/2007 | Kleckner et al. | |
| 2008/0004634 A1 | 1/2008 | Farritor et al. | |
| 2008/0004904 A1 | 1/2008 | Tran | |
| 2008/0031426 A1 | 2/2008 | Weeks | |
| 2008/0103554 A1 | 5/2008 | Dicks et al. | |
| 2009/0003680 A1 | 1/2009 | Lautenschlager | |
| 2009/0114761 A1 | 5/2009 | Sells, II | |
| 2009/0148011 A1 | 6/2009 | Zhao | |
| 2009/0212157 A1 | 8/2009 | Arlton et al. | |
| 2009/0244485 A1 | 10/2009 | Walsh et al. | |
| 2010/0125175 A1 | 5/2010 | Vallone | |
| 2010/0150400 A1 | 6/2010 | Ashikaga | |
| 2010/0166252 A1 | 7/2010 | Ahmed et al. | |
| 2010/0181424 A1 | 7/2010 | Goossen et al. | |
| 2010/0284582 A1 | 11/2010 | Petit | |
| 2010/0305633 A1 | 12/2010 | Aziz | |
| 2011/0070835 A1 | 3/2011 | Borras et al. | |
| 2011/0117014 A1 | 5/2011 | Norenberg | |
| 2011/0142413 A1 | 6/2011 | Kang et al. | |
| 2011/0190579 A1 | 8/2011 | Ziarno et al. | |
| 2012/0215075 A1 | 8/2012 | Surace et al. | |
| 2012/0216697 A1 | 8/2012 | Jacobsen et al. | |
| 2012/0221310 A1 | 8/2012 | Sarrafzadeh et al. | |
| 2012/0252485 A1 | 10/2012 | Wolverton et al. | |
| 2013/0102854 A1 | 4/2013 | Zheng et al. | |
| 2013/0219294 A1 | 8/2013 | Goldman-Shenhar et al. | |
| 2014/0039323 A1 | 2/2014 | Spector | |
| 2014/0072190 A1 | 3/2014 | Wu et al. | |
| 2014/0098018 A1 | 4/2014 | Kim et al. | |
| 2014/0183300 A1 | 7/2014 | MacCulloch et al. | |
| 2014/0200419 A1 | 7/2014 | Ermakov et al. | |
| 2014/0200826 A1 | 7/2014 | Centola et al. | |
| 2014/0350961 A1 | 11/2014 | Csurka et al. | |
| 2015/0025343 A1 | 1/2015 | Gareau et al. | |
| 2015/0195430 A1 | 7/2015 | Wadhwa et al. | |
| 2015/0324541 A1 | 11/2015 | Cheung et al. | |
| 2015/0360797 A1* | 12/2015 | Melish | B64F 1/02 244/110 C |
| 2016/0004920 A1* | 1/2016 | Armstrong-Crews | H04N 13/296 348/46 |
| 2016/0023760 A1* | 1/2016 | Goodrich | F41H 13/0006 244/76 R |
| 2016/0026865 A1* | 1/2016 | Reynolds, Jr. | G06V 20/00 382/103 |
| 2016/0111008 A1 | 4/2016 | Reinke et al. | |
| 2016/0117932 A1* | 4/2016 | Park | G01S 19/39 701/3 |
| 2016/0249813 A1 | 9/2016 | Zhang | |
| 2016/0250535 A1 | 9/2016 | Yatsko | |
| 2016/0251088 A1 | 9/2016 | Melish et al. | |
| 2016/0293015 A1* | 10/2016 | Bragin | B64C 39/024 |
| 2016/0376029 A1* | 12/2016 | Sekiya | B64F 1/0295 244/110 F |
| 2017/0000392 A1 | 1/2017 | Smith | |
| 2017/0057635 A1* | 3/2017 | Strayer | B64C 39/024 |
| 2017/0059692 A1* | 3/2017 | Laufer | G05D 1/12 |
| 2017/0085867 A1* | 3/2017 | Baran | B41M 3/008 |
| 2017/0144756 A1 | 5/2017 | Rastgaar Aagaah | B64D 3/00 |
| 2017/0192089 A1* | 7/2017 | Parker | G01S 7/414 |
| 2017/0205820 A1* | 7/2017 | Liu | B64C 39/022 |
| 2017/0225784 A1* | 8/2017 | Hayes | B64C 39/024 |
| 2017/0253348 A1* | 9/2017 | Ashdown | F41H 13/0006 |
| 2017/0261292 A1* | 9/2017 | Armstrong | F41H 11/02 |
| 2017/0261604 A1* | 9/2017 | Van Voorst | G01S 7/4817 |
| 2017/0291704 A1* | 10/2017 | Alegria | G08G 5/0039 |
| 2017/0355461 A1* | 12/2017 | Naito | F41H 13/00 |
| 2017/0356726 A1* | 12/2017 | Theiss | F41H 13/0006 |
| 2017/0367580 A1 | 12/2017 | DiMaio et al. | |
| 2017/0369169 A1* | 12/2017 | Lee | B64U 10/16 |
| 2018/0162528 A1* | 6/2018 | McGrew | B64C 37/02 |
| 2018/0162529 A1 | 6/2018 | Klein | |
| 2018/0162530 A1* | 6/2018 | Klein | B64D 1/02 |
| 2018/0164080 A1* | 6/2018 | Chi-Hsueh | B64U 70/30 |
| 2018/0197420 A1* | 7/2018 | Banga | G08G 5/006 |
| 2018/0224262 A1* | 8/2018 | Klein | B64U 20/10 |
| 2018/0237161 A1* | 8/2018 | Minnick | B64F 1/007 |
| 2018/0244401 A1* | 8/2018 | Kilian | B64C 25/68 |
| 2018/0257780 A1 | 9/2018 | Sassinsky | |
| 2018/0335779 A1 | 11/2018 | Fisher et al. | |
| 2019/0025858 A1* | 1/2019 | Bar-Nahum | G06T 7/73 |
| 2019/0061772 A1 | 2/2019 | Prinz | |
| 2019/0063881 A1 | 2/2019 | Abramov et al. | |
| 2019/0063991 A1 | 2/2019 | Zeulner | |
| 2019/0065859 A1* | 2/2019 | Togashi | G06T 7/215 |
| 2019/0068953 A1* | 2/2019 | Choi | B64C 39/024 |
| 2019/0100315 A1* | 4/2019 | Theiss | B64D 17/78 |
| 2019/0112045 A1* | 4/2019 | Zhang | B64C 39/024 |
| 2019/0129427 A1* | 5/2019 | Sugaki | B64D 7/00 |
| 2019/0176684 A1 | 6/2019 | Zych | |
| 2019/0176986 A1* | 6/2019 | Addonisio | G05D 1/0027 |
| 2019/0346241 A1* | 11/2019 | Metz | F41H 13/0006 |
| 2020/0077903 A1 | 3/2020 | Smith | |
| 2020/0108922 A1* | 4/2020 | Smith | F41H 11/02 |
| 2020/0108923 A1* | 4/2020 | Smith | G05D 1/0094 |
| 2020/0108924 A1* | 4/2020 | Smith | F41H 13/0043 |
| 2020/0108925 A1 | 4/2020 | Smith et al. | |
| 2020/0108926 A1 | 4/2020 | Smith et al. | |
| 2020/0327986 A1 | 10/2020 | Kurniawan et al. | |
| 2020/0405148 A1 | 12/2020 | Tran | |
| 2022/0005567 A1 | 1/2022 | Smith | |
| 2022/0282962 A1 | 9/2022 | Burnam et al. | |
| 2022/0398838 A1* | 12/2022 | Teslenko | G06V 20/176 |
| 2023/0192292 A1 | 6/2023 | Smith et al. | |

FOREIGN PATENT DOCUMENTS

| | | | | |
|---|---|---|---|---|
| CN | 109410248 A | * | 3/2019 | G06T 7/246 |
| CN | 107340777 B | * | 12/2020 | G05D 1/0692 |
| DE | 102015003323 A1 | | 9/2016 | |
| EP | 3142072 A1 | | 3/2017 | |
| FR | 2965908 A1 | | 4/2012 | |
| JP | 2007-223491 A | | 9/2007 | |
| JP | 2017-537484 A | | 12/2017 | |
| JP | 2018-125670 A | | 8/2018 | |
| JP | 2019-060589 A | | 4/2019 | |
| JP | 2019-526846 A | | 9/2019 | |
| KR | 10-2015-0145786 | | 12/2015 | |
| KR | 10-2016-0071027 A | | 6/2016 | |

(56) References Cited

FOREIGN PATENT DOCUMENTS

| KR | 10-2017-0079782 | | 7/2017 | | |
|---|---|---|---|---|---|
| KR | 10-1830880 | B1 | 2/2018 | | |
| KR | 10-2020-0042307 | A | 4/2020 | | |
| WO | WO-2016122739 | A2 * | 8/2016 | ........... | B64C 39/024 |
| WO | WO 2016/193722 | A1 | 12/2016 | | |
| WO | WO 2017/091726 | A1 | 6/2017 | | |
| WO | WO 2018/016017 | A1 | 1/2018 | | |
| WO | WO-2018009835 | A2 * | 1/2018 | ............ | B64C 19/00 |
| WO | WO 2018/112281 | A1 | 6/2018 | | |
| WO | WO-2021236237 | A2 * | 11/2021 | ............... | G06T 7/11 |

OTHER PUBLICATIONS

Rangnekar et al. "Aerial Spectral Super-Resolution using Conditional Adversarial Networks" Computer Vision and Pattern Recognition, Dec. 23, 2017, pp. 1-9.*

Airspace Systems Inc.; Airspace LV; Vimeo [online] [video]; vimeo.com; (Apr. 5, 2017); 2 pages; [retrieved on Oct. 2, 2018]; Retrieved from <URL: https://vimeo.com/211704482?from=outro-embed >.

Airspace Systems, Inc.; Airspace; airspace.co; (2016); 4 pages; [retrieved on Oct. 2, 2018]; Retrieved from <URL: http://airspace.co/#technology >.

ATHERTON; This Drone Fires Nets to Catch Other Drones; Popular Science; (Apr. 5, 2016); [retrieved on Oct. 2, 2018]; Retrieved from <URL: https://www.popsci.com/drone-fires-nets-to-catch-other-drones >.

Bigio et al., Ultraviolet and visible spectroscopies for tissue diagnostics: fluorescence spectroscopy and elastic-scattering spectroscopy, Phys. Med. Biol., 1997, pp. 803-814, IOP Publishing Ltd, United Kingdom.

DEDRONE; Dedrone Videos; dedrone.com; (2018); 3 pages; [retrieved on Oct. 2, 2018]; Retrieved from <URL: https://www.dedrone.com/products/videos >.

Gandjbakhche et al., Quantitative Fluorescent Imaging of Specific Markers of Diseased Tissue, IEEE Journal of Selected Topics in Quantum Electronics, Dec. 1996, pp. 914-921, vol. 2 No. 4.

Groupe Assmann; Drone Interception; YouTube [online] [video]; YouTube.com; (Dec. 12, 2014); 2 pages; [retrieved on Oct. 2, 2018]; Retrieved from <URL: https://youtu.be/APWG3VEGbJw >.

MOSEMAN; This Drone Interceptor Captures Your Pathetic Puny Drone With a Net; Popular Mechanics; (Feb. 11, 2015); 6 pages; [retrieved on Oct. 2, 2018]; Retrieved from <URL: http://www.popularmechanics.com/flight/drones/a14032/france-dispatches-a-net-carrying-bully-drone-to-catch/ >.

Openworks Engineering Ltd .; SkyWall; Openworks Engineering; [brochure]; (2017); 15 pages; < URL: https://openworksengineering.com/skywall >.

STARRS; "To Catch a Drone, Use a Net"; The Washington Post (WP Company LLC); (Jan. 15, 2016); 3 pages; [retrieved on Oct. 2, 2018]; Retrieved from <URL: https://www.washingtonpost.com/news/morning-mix/wp/2016/01/15/watch-a-drone-catcher-net-a-rogue-drone/?utm_term=.63257596ca17 >.

Wang et al., Tissue refractive index as marker of disease, Journal of Biomedical Optics, Nov. 2011, 8 pages, vol. 16(11).

International Search Report for International Application No. PCT/US2021/025465 dated Jan. 4, 2022, 14 pages.

Extended European Search Report issued Sep. 4, 2023, in EP Application No. 23169523.0 filed Apr. 1, 2021, 13 pages.

* cited by examiner

SYSTEM AND METHODS FOR EARLY DETECTION OF NON-BIOLOGICAL MOBILE AERIAL TARGET

RELATED APPLICATIONS

This application claims the benefit of U.S. Provisional Application Ser. No. 63/003,711, filed Apr. 1, 2020, and entitled, "System and Methods for Early Detection of Non-Biological Mobile Aerial Target" which is incorporated by reference in its entirety herein.

FIELD OF THE TECHNOLOGY

The present technology relates to improved devices, methods, and systems for early detection and identification of non-biological mobile aerial objects. More particularly, the present technology relates to devices, methods, and systems for detecting the presence of an unmanned aerial vehicle based on microscopic changes to the geometry of an object in three-dimensional space.

BACKGROUND OF THE TECHNOLOGY

The Federal Aviation Administration (FAA) suspects that the number of unmanned aerial vehicles (UAVs) flying in the U.S. to be as many as 30,000. This is problematic for those interested in maintaining the safety of third parties from attacks by UAVs or other unwanted incursion by UAVs into restricted air space. Given the range of self-propelled munitions that may be attached to UAVs, the early detection of UAVs is of paramount concern. Acoustic sensors or radars may fail in detecting the low speed and low electromagnetic signature of smaller UAVs. Likewise, acoustic sensors may fail in detecting UAVs that have an air speed and vector matching the air speed and vector of a sensor attempting to identify a target UAV. Infrared and other sensors may have difficulty differentiating between biological and non-biological targets at great distances. Work has been done to detect and avoid UAV collisions. However, a solution to early detection and neutralization of UAVs is lacking.

SUMMARY OF THE INVENTION

While not limiting the scope of the technology, in one aspect of the technology, a method of classifying a distant unknown target is disclosed comprising scanning a predetermined area of an aerial landscape with one or more cameras for an airborne target and capturing a plurality of images of the airborne target with the one or more cameras, the one or more cameras in communication with a processor. Microscopic temporal variations between the plurality of images of the airborne target are amplified, wherein the at least one microscopic temporally detected variation comprises a change in the geometry of a two-dimensional image of the airborne target. After detecting a change in the geometry of the image of the airborne target, the method further comprises detecting an intensity value of the airborne target.

In another aspect of the technology, a method is disclosed comprising generating a profile of a rate of change of at least one microscopic temporally detected variation of the geometry of the two-dimensional image of the target and comparing the profile of the target to a pre-existing aggregate profile of a plurality of known airborne biological or non-biological subjects, the aggregate profile corresponding to the at least one microscopic temporally detected variation of geometry of the two-dimensional image of the known airborne biological or non-biological subjects. The method further comprises detecting differences between the profile of the airborne target and the aggregate profile of the plurality of known targets and determining a probability that the airborne target is one of the known targets.

In another aspect of the technology, a system configured to classify a moving airborne target is disclosed comprising a camera in communication with one or more processors and one or more memories operatively coupled to at least one of the one or more processors, having instructions stored thereon. When executed by at least one of the one or more processors, the instructions cause the system to capture a plurality of images of the moving airborne target, the images being captured in a frequency of light in a first band ranging from 400 nm to 700 nm and a second band ranging from 700 nm to 1100 nm. The instructions further cause the system to amplify microscopic temporal variations between the plurality of images of the target and generate a profile of a rate of change of at least one microscopic temporally detected variation of the geometry of the two-dimensional image of the target in the first band. And measure a color intensity value of the moving airborne target based on the images of the airborne target captured in the second band and compare the color intensity value to a profile of known color intensity values corresponding to airborne biological and non-biological subjects.

In another aspect of the technology, a system configured to classify a moving airborne target is disclosed comprising a camera in communication with one or more processors and one or more memories operatively coupled to at least one of the one or more processors having instructions stored thereon. When executed by at least one of the one or more processors, the instructions cause the system to capture a plurality of images of the moving airborne target and amplify microscopic temporal variations between the plurality of images of the target and generate a profile of the at least one microscopic temporally detected variation of the two-dimensional geometry of the image of the target; wherein the at least one microscopic temporally detected variation of the two-dimensional geometry comprises a vertical variation in the two-dimensional geometry of the moving target.

In another aspect of the technology, a system configured to classify a moving airborne target is disclosed comprising a camera in communication with one or more processors and one or more memories operatively coupled to at least one of the one or more processors and having instructions stored thereon that. When the instructions are executed by at least one of the one or more processors, it causes the system to capture a plurality of images of the moving airborne target and amplify microscopic temporal variations between the plurality of images of the target and generate a profile of the at least one microscopic temporally detected variation of the two-dimensional geometry of the image of the target; wherein the at least one microscopic temporally detected variation of the two-dimensional geometry of the image of the target comprises a variation in the frequency of change of the two-dimensional geometry of the moving target.

In another aspect of the technology, one or more computer readable media are disclosed comprising one or more non-transitory computer-readable media storing instructions, wherein the instructions, when executed by one or more computing devices, cause at least one of the one or more computing devices to scan a predetermined area of an aerial landscape for an airborne target and capture a plurality of images of the airborne target. It also causes the one or more computing devices to amplify microscopic temporal variations between the plurality of images of the airborne target in the frequency range of 400 nm to 700 nm, wherein the at least one microscopic temporally detected variation comprises a change in the geometry of a two-dimensional image of the airborne target. After detecting a change in the geometry of the image of the airborne target, the one or more computing devices detect an intensity value of the airborne target in the frequency range of 700 nm to 1100 nm.

BRIEF DESCRIPTION OF THE DRAWINGS

The present technology will become more fully apparent from the following description and claims, taken in conjunction with the accompanying drawings. Understanding that these drawings merely depict exemplary aspects of the present technology they are, therefore, not to be considered limiting of its scope. It will be readily appreciated that the components of the present technology, as generally described and illustrated in the figures herein, could be arranged and designed in a wide variety of different configurations. Nonetheless, the technology will be described and explained with additional specificity and detail through the use of the accompanying drawings in which:

DETAILED DESCRIPTION OF EXEMPLARY ASPECTS OF THE TECHNOLOGY

Figure 1:
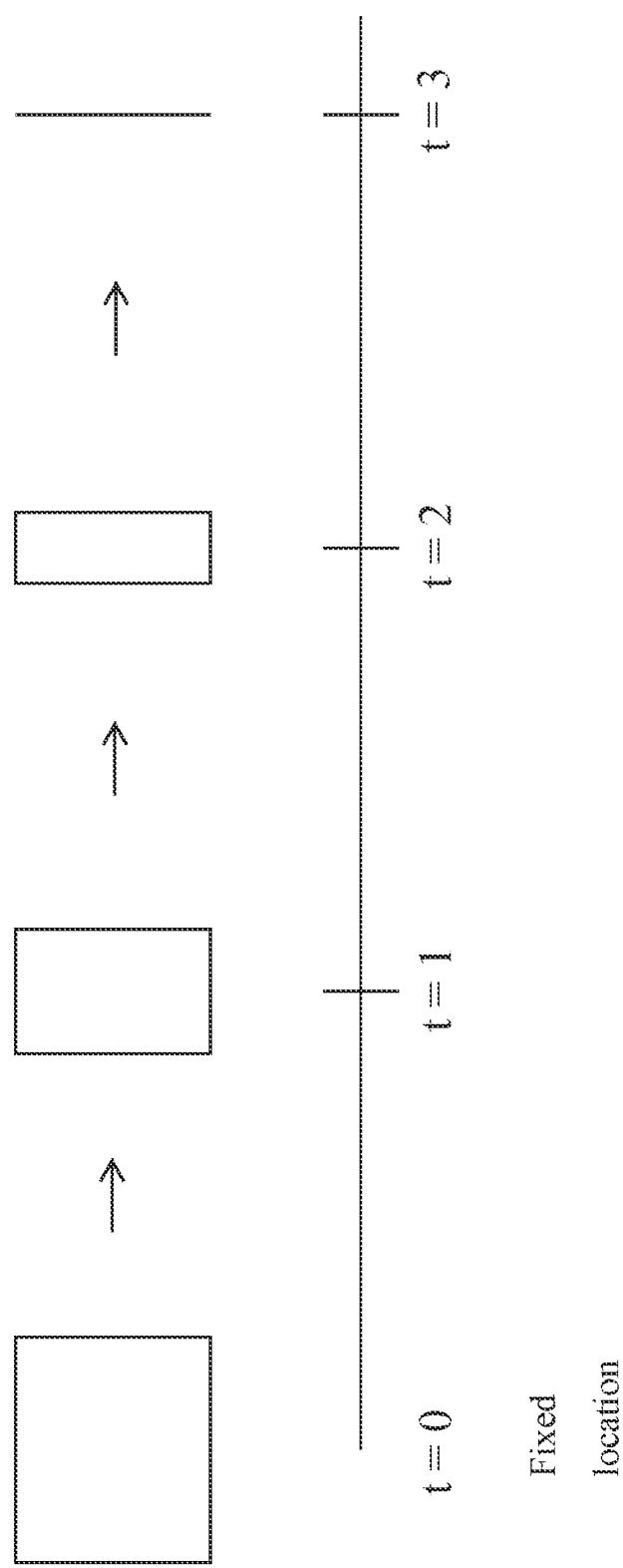
FIG. 1 is an example of relativistic changes to the geometry of an object in motion from the perspective of a viewer in a fixed location.

The following detailed description of exemplary aspects of the technology makes reference to the accompanying drawings, which form a part hereof and in which are shown, by way of illustration, exemplary aspects in which the technology can be practiced. While these exemplary aspects are described in sufficient detail to enable those skilled in the art to practice the technology, it should be understood that other aspects can be realized and that various changes to the technology can be made without departing from the spirit and scope of the present technology. Thus, the following more detailed description of the aspects of the present technology is not intended to limit the scope of the technology, as claimed, but is presented for purposes of illustration only and not limitation to describe the features and characteristics of the present technology, to set forth the best mode of operation of the technology, and to sufficiently enable one skilled in the art to practice the technology. Accordingly, the scope of the present technology is to be defined solely by the claims. The following detailed description and exemplary aspects of the technology will be best understood by reference to the accompanying drawings and description, wherein the elements and features of the technology are designated by numerals throughout the drawings and described herein.

As used in this specification and the claims, the singular forms "a," "an" and "the" include plural referents unless the context clearly dictates otherwise. Thus, for example, reference to "a layer" includes a plurality of such layers.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps can be performed, and certain of the stated steps can possibly be omitted and/or certain other steps not described herein can possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. Objects described herein as being "adjacent to" each other can be in physical contact with each other, in close proximity to each other, or in the same general region or area as each other, as appropriate for the context in which the phrase is used.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness can in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element can still actually contain such item as long as there is no measurable effect thereof.

As used herein, the term "about" is used to provide flexibility to a range endpoint by providing that a given value can be "a little above" or "a little below" the endpoint. Unless otherwise stated, use of the term "about" in accordance with a specific number or numerical range should also be understood to provide support for such numerical terms or range without the term "about". For example, for the sake of convenience and brevity, a numerical range of "about 50 angstroms to about 80 angstroms" should also be understood to provide support for the range of "50 angstroms to 80 angstroms."

As used herein, the term "cross-section" is used to describe a two-dimensional profile or silhouette of a target or object that is imaged. It is not used herein to describe a cut-away profile of an imaged object.

The term "radio signal" unless specified otherwise, is used to describe any frequency of radio signal.

An initial overview of technology is provided below and specific technology is then described in further detail. This initial summary is intended to aid readers in understanding the technology more quickly, but is not intended to identify key or essential features of the technology, nor is it intended to limit the scope of the claimed subject matter.

Broadly speaking, the technology described herein resides in a system configured to classify a distant aerial object as biological (e.g., a bird) or as a non-biological airborne target such as a UAV. A camera is coupled to, or otherwise in communication with, a processor and configured to capture at least a first and second image of the unknown airborne target. In practice, the camera will capture video of the target. The processor comprises executable code configured to amplify temporal variations between the first and second image (or other of a plurality of images) of the subject and generate a profile of at least one microscopic temporally detected variation in the geometry (e.g., changes in pixel values of the 2-D image, etc.) of the subject, though any number of different variations of the geometry of the image of the target are considered for use in classifying the target. The term "microscopic" as used herein refers to measurements less than 0.000001 times the unit of measure used. For example, 0.000001 inches or 0.000001 meters. In one aspect of the technology, the variations are intended to be correlated with known variations in the geometry of the cross-section of known targets under similar circumstances. Specifically, the processor looks to unique changes in the geometry of the image of a target that, at long distances from the camera, are used to classify the target, in one aspect, as a UAV that may pose a threat or as a bird. The unique changes include, but are not limited to, the rate of change of the leading edge of the target, the rate of change of portions of a two-dimensional image or silhouette of the target, the frequency of movement in areas where a propeller might be present, the frequency of vertical movement of wings, the differences between heat signatures (i.e., infrared wavelength intensity or value or "intensity value") overall or differences between the heat signature of the main body and the wing, or the main body and a motor (on a UAV), etc. Velocity, acceleration, including the absence of either, in short, biological systems operate within a certain quantifiable envelope of performance, and cannot go either "too slow" or "too fast." They cannot go straight up, or sideways, etc. That general envelope of performance can be used as a subset of the filtering algorithm to separate biological from man-made. Another subset is the nature of the variation in the shape of the object; namely flapping wings are moving, and are moving at a given rate, whereas a quadcopter, hexacopter, octocopter, or fixed wing UAV, for example, has a comparatively fixed cross-section that can only change based on the change in point-of-view, which limits the rate that that variable can change in man-made machines, versus biological entities. In the cases of copters, their shape is almost a constant regardless of whether they rotate any amount with respect to the point of view. Using a high-resolution camera (e.g., a 4K video-cameras) with a high frame rate and shutter speed of 30 or 60 frames per second, the movement of the target is isolated and minor variations in the changes to the shape of the cross-sectional geometry are amplified and examined. Advantageously, objects that are viewed at a great distance (e.g., greater than 1 kilometer) from the camera can be classified as being a potential threat before posing an actual threat. Classifying the object as a threat before launching countermeasures saves valuable resources and potentially saves lives and property. In one aspect of the technology, when the probability that an airborne object is a non-biological object that corresponds to a known or suspected defense threat exceeds a threshold value (e.g., 30%, 40%, 50%, 60%, etc.) countermeasures can be taken in an attempt to neutralize the threat. Such countermeasures include, but are not limited to, propagating a jamming signal in the direction of the non-biological object, launching a missile at the object, and/or otherwise shooting the object down.

A classification of the target can include a non-biological airborne target (e.g., a UAV or other aircraft) or a biological airborne target (e.g., a bird). The variation in the visualized geometry (e.g., a 2-D cross section, outline, or silhouette of an image of the target) can include changes in the overall shape of the entire imaged target, portions of the imaged target, changes to the shape of the leading edge of the imaged target, or other changes to the imaged target indicating movement in a fashion that suggests one classification or another. The processor is further configured to compare the profile of the imaged target to a pre-existing aggregate profile of known imaged targets. The aggregate profile of the known imaged targets corresponds to the at least one microscopic temporally detected variation in the cross-sectional geometry of the principal target. A process is employed to determine the probability that the classification of the principal target is similar to (or dissimilar to) the known properties of the known targets. For example, if the variations of the target being examined relates to the correlation between frequency of movement of a bird wing or movement in an area corresponding to a propeller, a positive classification may be made. The probability of correlation is calculated using the aggregate profile of known or predicted behavior regarding a known target. For example, the changes in observed cross-sectional geometry of an image of the unknown target is compared to an aggregate profile of cross-sectional geometry of the known targets (i.e., birds or UAVs) having a known wing movement pattern or frequency and/or a known propeller turn rate. Put plainly, the processor is configured to detect differences and/or similarities between the profile of the cross-sectional geometry of the target and the aggregate profile of the cross-sectional geometry of known targets and correlate the similarities and/or differences between the two.

In accordance with one aspect of the technology, a time series of color values at any spatial location (e.g., a pixel) of images of a target can be taken and microscopic variations are amplified in a given temporal frequency band of interest. The processor (or user) can select and then amplify a band of temporal frequencies including, as one non-limiting example, plausible bird wing beat rates, propeller rotation rates, or plausible heat signatures (i.e., intensity values). The amplification isolates and reveals temporal variations that may correspond to the different temporal frequencies of these events. For this application, lower spatial frequencies can be temporally filtered to allow a subtle input signal to rise above the camera sensor and quantization noise. The temporal filtering approach not only amplifies color variation, but can also reveal low-amplitude motion.

The system's mathematical analysis can employ a linear approximation related to the brightness constancy assumption used in optical flow formulations. The method also can derive the conditions under which this approximation holds. This can lead to a multi-scale approach to magnify motion without feature tracking or motion estimation even though the target may be in motion. Indeed, the high frame rate and shutter speed of the camera will compare first and second images, taken consecutively in time, in such a manner that significant motion artifacts from movement that is observable to the naked eye is minimized. The method studies and amplifies the variation of pixel values over time, in a spatially-multi-scale manner. The Eulerian approach (i.e., the approach described herein) to motion magnification does not explicitly estimate motion, but rather exaggerates minute motion by amplifying temporal color changes at fixed positions. The method can employ differential approximations that form the basis of optical flow algorithms and generate an image showing the amplified pixels in a composite image.

In one aspect, the method can employ localized spatial pooling and bandpass filtering to extract and reveal visually the signal corresponding to motion. This primal domain analysis allows amplification and visualization of the pulse signal at each location on the target (or area of the target observed). Nearly invisible changes in a distant target in a dynamic environment can be revealed through Eulerian spatio-temporal processing of standard monocular video sequences. The system can be run in real time. An analysis of the link between temporal filtering and spatial motion shows that the method is suited to small displacements and lower spatial frequencies. A single framework can amplify both spatial motion and purely temporal changes (e.g., propeller motion, changes to 2-D shape of an object, wing motion, etc.) and can be adjusted to amplify particular temporal frequencies.

In one aspect of the technology, a spatial decomposition module of a system first decomposes input images into different spatial frequency bands, then applies the same temporal filter to the spatial frequency bands. The outputted filtered spatial bands are then amplified by an amplification factor, added back to the original signal by adders, and collapsed by a reconstruction module to generate the output images. The temporal filter and amplification factors can be tuned to support different applications. The output images correlate to specific numerical values related to a base or "anticipated" classification of different targets. For example, a baseline determination of the wing beat of a bird under a "normal" set of circumstances can be measured and compared with the frequency of vertical movement of a lateral portion of a target under both "normal" circumstances and under a varied set of circumstances. Likewise, a baseline determination of a trajectory, speed, or rate of change of the geometry of the image of the target can be measured and then compared with predicted trajectories, predicted speed, or predicted rates of change of cross-sectional geometry when subject to different environmental influences. The target, for example, may be subjected to a radio jamming or radio interception signal or may be subjected to a percussive signal (i.e., a loud noise, ultrasonic frequencies, explosions, or any radio signal disruptive to a biological entity, etc.) after which its behavior will be observed. Put plainly, a UAV with autonomous programming would likely not respond to a percussive signal but may be affected by radio interception signals. On the other hand, a UAV that was being controlled by a third party might detect a radio jamming signal and change its flight pattern or behave in a manner that suggests it is a UAV. Likewise, a bird or other biological entity, would be likely to respond to a percussive (i.e., a biologically disruptive) signal but would likely not be affected by radio jamming or radio interception signals. The comparison of changes between the target's "behavior" in response to the environmental influences may be barely detectable in a "naked eye" image of the target due to the great distance from the camera, but the system provides a method by which the target can be classified at a great distance from the camera by observing subtle changes in behavior in response to the environmental influences induced by the system.

In one aspect, the system combines spatial and temporal processing to emphasize subtle temporal changes in video images of the subject. The method decomposes the video sequence into different spatial frequency bands. These bands might be magnified differently because (a) they might exhibit different signal-to-noise ratios or (b) they might contain spatial frequencies for which the linear approximation used in motion magnification does not hold. In the latter case, the method reduces the amplification for these bands to suppress artifacts. When the goal of spatial processing is to increase temporal signal-to-noise ratio by pooling multiple pixels, the method spatially low-pass filters the frames of the video and downsamples them for computational efficiency. In the general case, however, the method computes a full Laplacian pyramid.

The system then performs temporal processing on each spatial band. The system considers the time series corresponding to the value of a pixel in a frequency band and applies a bandpass filter to extract the frequency bands of interest. As one example, the system can select frequencies within the range of 2-5 Hz, corresponding to 2 to 5 wing beats per second, if the user wants to magnify the frequency of flapping wings of certain small birds, for example. Of course other frequency rates may be used for other anticipated wing beat frequencies (e.g., 6 to 10 Hz for larger birds) or other harmonic movement useful for differentiating between a biological and non-biological target. If the system extracts the beat rate, it can employ a narrow frequency band around that value. The temporal processing is uniform for all spatial levels and for all pixels within each level. The method then multiplies the extracted bandpassed signal by a magnification factor $\alpha$. This factor can be specified by the user, and can be attenuated automatically. Next, the method adds the magnified signal to the original signal and collapses the spatial pyramid to obtain the final output. In one aspect of the technology, the microscopic changes in the pixel values that are observed in a specific frequency range can be given a "false color" coding to further accentuate and highlight areas of an image that may exhibit the identified frequency range. For example, in the example referenced above, a user may select frequencies in the range 2-5 Hz to be magnified. Movement that occurs in that range would not only be amplified but one or more images that are generated by the system would highlight the amplified area with a color coding that contrasted the amplified pixels from other adjacent non-amplified pixels.

Since natural videos are spatially and temporally smooth, and since the filtering is performed uniformly over the pixels, the method implicitly maintains spatio-temporal coherency of the results. The present method can amplify small motion without tracking motion as in Lagrangian methods. Temporal processing produces motion magnification using an analysis that relies on the first-order Taylor series expansions common in optical flow analyses as explained in U.S. Pub. 2014/0072190 to Wu et al. which is incorporated herein by reference in its entirety.

To process an input image by Eulerian video magnification, a user (or pre-programmed processor) can (1) select a temporal bandpass filter; (2) select an amplification factor, $\alpha$; (3) select a spatial frequency cutoff (specified by spatial wavelength, $\lambda_c$) beyond which an attenuated version of $\alpha$ is used; and (4) select the form of the attenuation for $\alpha$—either force $\alpha$ to zero for all $\lambda < \lambda_c$, or linearly scale a down to zero. The frequency band of interest can be chosen automatically in some cases, but it is often important for users to be able to control the frequency band corresponding to their application. In one application, the amplification factor and cutoff frequencies are all customizable by the user. In one aspect of the technology, the camera assets described herein can be configured to detect wavelengths of light in a variety of wavelengths of light. For example, in one aspect, the camera can be configured to detect a first band of wavelengths of light ranging from approximately 150 to 400 nm or 300 to 400 nm, a second band of wavelengths of light ranging from approximately 400 to 700 nm, and a third band of wavelengths of light ranging from approximately 700 to 1100 nm or 700 to 1400 nm. Advantageously, data regarding a moving target's state which may not be observable in the conventional visible spectrum of light (i.e., 400 to 700 nm) can be observed and used in connection with differentiating between a UAV which produces a significant amount of heat at its core and significantly less heat in its wings than, for example, a bird, depending on the configuration of the UAV and the location of its motors and/or other heat producing equipment. Images captured and analyzed in the wavelength frequency ranging from 700 to 1100 nm or 700 to 1400 nm can be used to measure the heat signature or intensity value of portions of the airborne targets.

Figure 2:
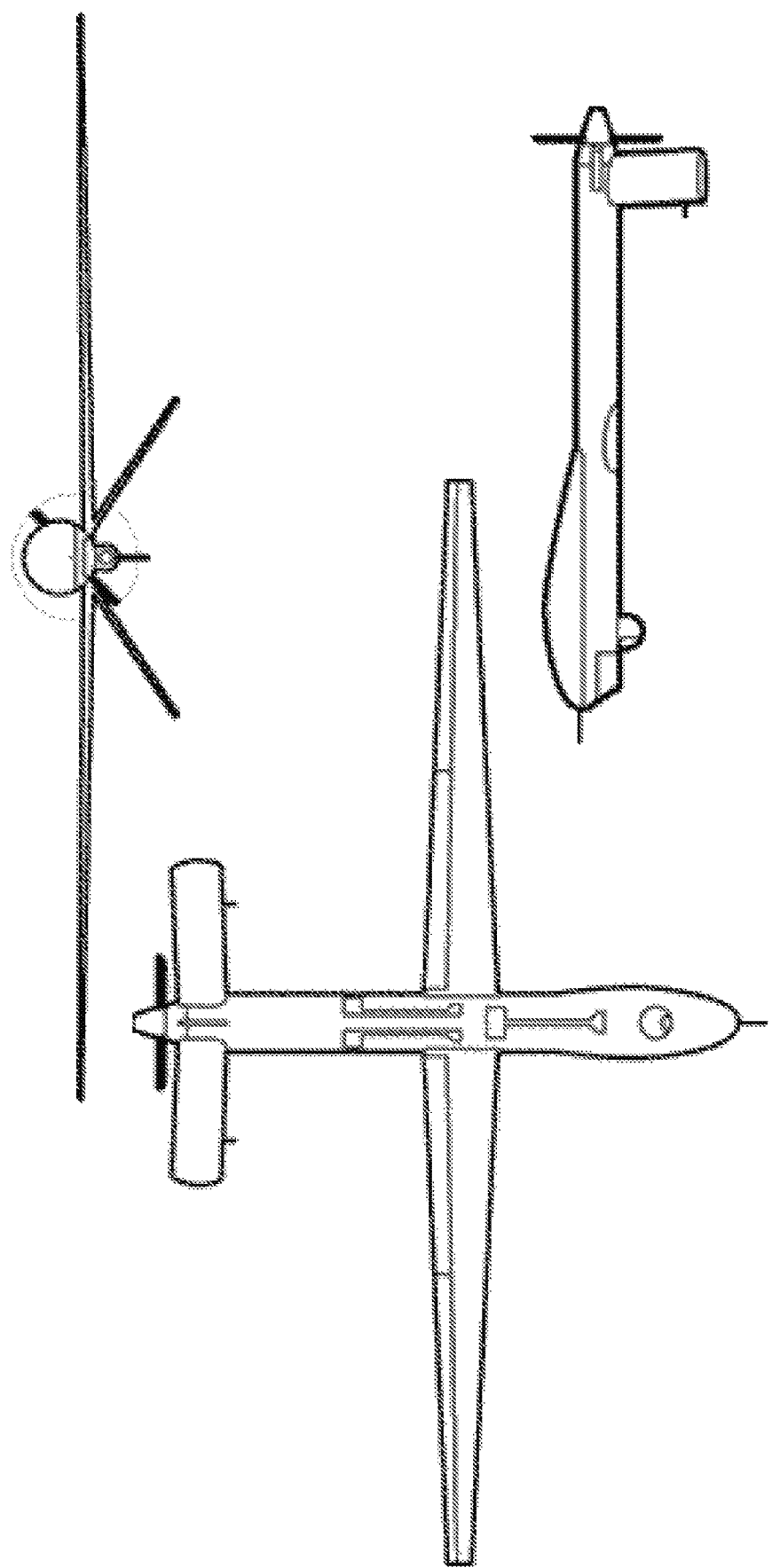
FIG. 2 is a plurality of different views of a UAV.
Figure 3:
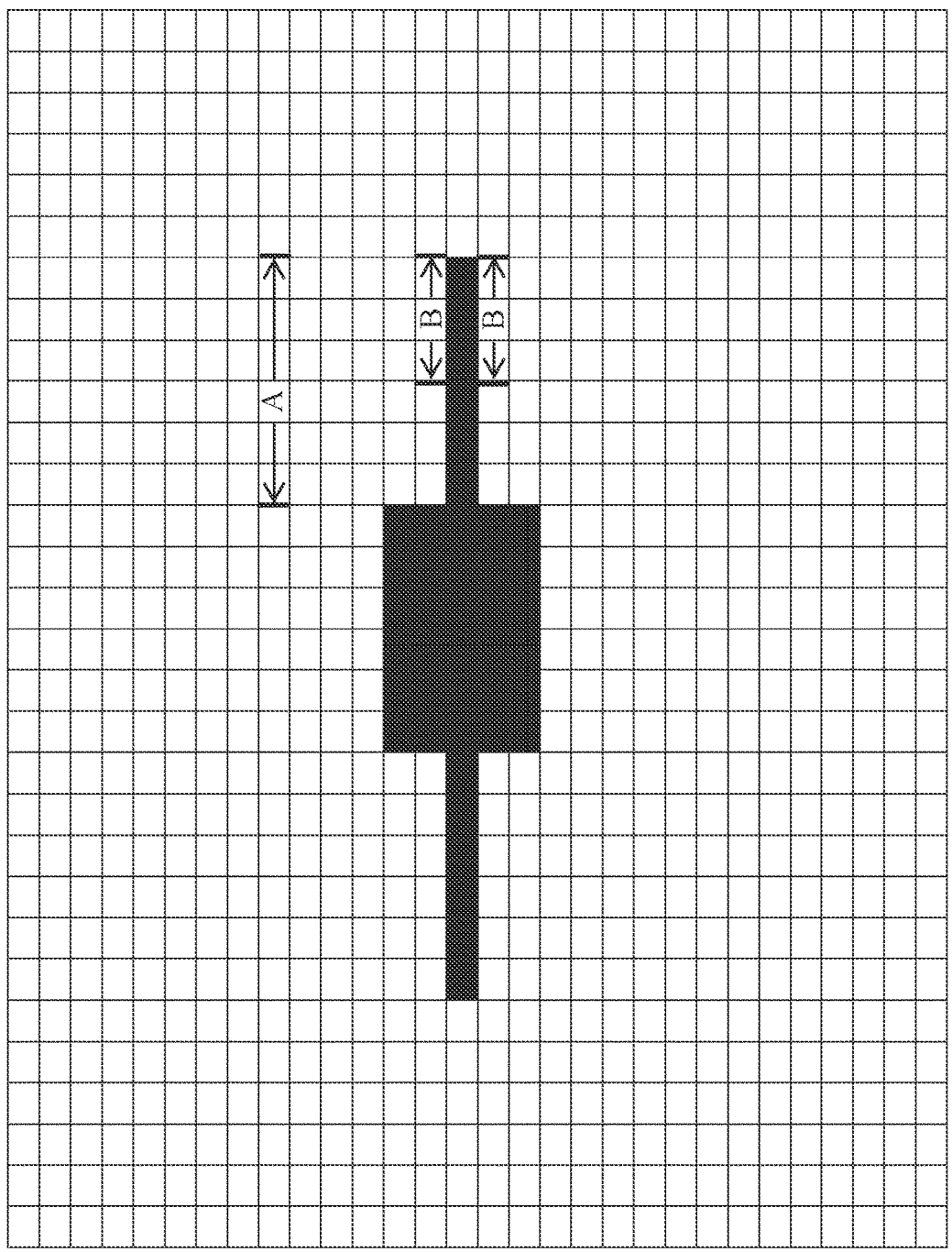
FIG. 3 is a 2-D cross-sectional pixel view of an unknown target view in accordance with one aspect of the technology.

In one aspect, Eulerian video magnification can be used to amplify changes or a rate of change the cross-sectional geometry of the image of a target. In this aspect, the temporal filter is tuned to wide frequency band that incorporates and the amplification factor can be set to a maximum value. To reduce motion magnification of irrelevant objects, a user-given mask amplifies the area near leading edge of the target where changes to the geometry are more readily amplified and observed. When observing a 2-dimensional object from a fixed location, the cross-sectional shape of that object will change over time. FIG. 1, for example, illustrates the change in shape of simple example of a 2-D box from the perspective of a fixed observer as that box travels to the right of the observer. Under microscopic conditions, the pixels on the leading edge of a 2-D image of the object are most likely to vary more quickly. Thus, the magnification of the leading edge is most likely to more quickly generate observable temporal variations which can be used to classify the target. FIG. 2 discloses a simple view of different perspectives of an exemplary UAV to demonstrate the complex geometry of a UAV. Depending on the direction of travel of the UAV with respect to the camera, the cross-sectional geometry of the leading edge of the UAV (or other target) will have a unique rate of change. The example of the 2-D box is an oversimplification of the processes used here but sufficiently illustrates relativistic geometry. In practice, the leading edge of a target may be a top of the target, a side of the target, a bottom of the target, or a combination of a side and top or bottom depending on the vector of the target and its spatial relationship with the camera. In any event, the leading edge is that edge of the 2-D image of the target that is traveling away from the camera. While improbable, in an instance where the target is traveling directly at the camera at the moment pluralities of images is recorded, all sides of the target would change proportionately. In an instance where there is no change at all in the observed target, the system would likely identify the target as a being suspended in the air and classify the target as a UAV. FIG. 3 is one example of the geometry of a cross-section of the image of an unknown target.

In another aspect of the technology, Eulerian video magnification can be used in an attempt to amplify propeller motion. In this aspect, the temporal filter is tuned to a frequency band that includes anticipated propeller rotation rates (e.g., 30 Hz (1,800 rpm) or 300 Hz (18,000 rpm) etc.) and the amplification factor can be set to $\alpha=10$. To reduce motion magnification of irrelevant objects, a user-given mask amplifies the area near the lateral portions of the target or, in another aspect, a centroid of the target where a propeller might be present. It is believed that movement of the propeller will barely be seen or not be seen at all in an unprocessed input video, but will be significantly more noticeable in the motion-magnified output. That motion is more pronounced and hence more useable in detecting a UAV because it corresponds to frequencies of movement that correspond to movement of a non-biological target.

In one aspect, if a frequency band corresponding to a propeller is identified, the system generates a positive "hit" or "threat" indication and deploys a system to neutralize the target. In one aspect, if a positive hit or threat of an unauthorized UAV is generated, the system deploys a separate UAV to seek and destroy the target, launches a targeted missile, or other ordinance to destroy the target as suits a particular application.

Likewise, in other aspects of the technology the user-given mask may amplify lateral areas of the target where a flapping wing of a bird would be expected. Spatial filtering can be combined with directional filtering to amplify a specific direction of movement or a direction of change between adjacent pixels. For example, in accordance with one aspect of the technology, and as illustrated on FIG. 3, a 2-D pixelated image of an unknown target comprises a central portion having an identifiable centroid, upper boundary, lower boundary, and opposing side boundaries. Two wing structures extend laterally from the opposing side boundaries. In this instance, and at great distances, it may be difficult for the observer to detect any movement of the wings of the target regardless of its status as a bird or UAV and/or classify the object as a bird or UAV. A spatial filter may be applied specifically to the wing area "A" of the target and a directional filter may be applied to amplify only changes to pixels a specific direction. For example, the directional filter may be applied to amplify changes to pixels that are above or below (designated as "B") the area "A" identified by the spatial filter to enhance movements that may be attributable to the wing movement of a bird. Likewise, the directional filter may be applied to amplify changes to pixels that are located on the lateral side of the spatially filtered pixels to enhance movements that may be attributable to a horizontal propeller. Of course, other subtle movements of an unknown target may also be observed and used to classify the target including, but not limited to, changes in pixel values on any portion of an edge of the target.

While evaluation of individual attributes of the unknown target are discussed above, it is understood that one or more different attributes may be evaluated in any plurality of images of an unknown target to increase the probability of an accurate classification of the unknown target. For example, in one aspect of the technology temporal changes to the general cross-sectional geometry of the image of the unknown target are amplified and evaluated as well as temporal changes to the vertical movement of the wing of the target. In aspects where the two different changes are distinguishable, the two different changes will occur in two different non-parallel directions. For example, one of the directions of change may correspond to a direction of travel of the unknown object and another may correspond to a direction of travel of the wing of a bird or the propeller of the target; each helping classify the target as a UAV or a bird. Meaning, general movement of an unknown objection in direction D1 is different than the changes in cross-sectional geometry of the wings of the unknown object.

In one aspect of the technology, the process selects the temporal bandpass filter to pull out the motions or signals to be amplified. The choice of filter is generally application dependent. For motion magnification, a filter with a broad passband can be used. For color amplification, a narrow passband produces a more noise-free result. Ideal bandpass filters can be used for color amplification, since they have passbands with sharp cutoff frequencies. Low-order IIR filters can be useful for both color amplification and motion magnification and are convenient for a real-time implementation. In general, two first-order lowpass IIR filters with cutoff frequencies $\omega_l$ and $\omega_h$ can be used to construct an IIR bandpass filter. The process selects the desired magnification value, $\alpha$, and spatial frequency cutoff, $\lambda_c$. Various $\alpha$ and $\lambda_c$ values can be used to achieve a desired result. The user can select a higher a that violates the band to exaggerate specific motions or color changes at the cost of increasing noise or introducing more artifacts.

In one aspect, the system takes a video as input and exaggerates subtle color changes and micro-motions. To amplify motion, the method does not perform feature tracking or optical flow computation, but merely magnifies temporal color changes using spatio-temporal processing. This Eulerian based method, which temporally processes pixels in a fixed spatial region, reveals informative signals and amplifies small motions in real-world videos. The Eulerian-based method begins by examining pixel values of two or more images. The method then determines the temporal variations of the examined pixel values. The method is designed to amplify only small temporal variations. While the method can be applied to large temporal variations, the advantage in the method is provided for small temporal variations. Therefore, the method can be optimized when the input video has small temporal variations between the images. The method can then apply signal processing to the pixel values. For example, signal processing can amplify the determined temporal variations, even when the temporal variations are small. For this reason, the use of a camera with high capture frame rate and shutter speeds are desirable to minimize artifacts present from general movement of the airborne target.

In one aspect of the technology, the camera is mounted to a friendly UAV or other aerial vehicle and placed in an area surrounding a vicinity that is to be monitored for hostile UAV activity. The friendly UAV may have an autonomous function where it travels a predetermined course and scans a predetermined area of three-dimensional space over time. In another aspect, the friendly UAV may be manually operated. In one aspect, in the event a potential hostile UAV is detected, the friendly UAV engages a system of controls wherein the UAV is in a near stationary state and begins to record the potential hostile UAV. In another aspect, the friendly UAV continues to move in a direction toward the potential hostile UAV. In either aspect, the motion of the friendly UAV, either small or significant, is accounted for by the processor and subtracted from images to minimize noise.

In one aspect of the technology, a plurality of cameras separated from one another are used to image the same unknown target. Using methodology similar to that described in this application to magnify microscopic temporal variations in geometry, a plurality of profiles of the unknown target are acquired and used to "triangulate" the unknown target providing additional data to classify the unknown target. In addition to the classification of the unknown target, the plurality of profiles can be combined to predict the trajectory and speed of the unknown target. For example, in one aspect of the technology, by comparing the rate of change of the overall cross-sectional geometry of the unknown target (i.e., the 2-D image captured by the camera, profile, or silhouette of the target), the vector and speed of the unknown target can be estimated.

In one exemplary aspect, if two cameras (a "right" camera and a "left" camera in a system are separated by some lateral distance X, and both are looking at an object some distance away, Y, then the two cameras will "see" different things happening to the approaching object. In one aspect, where the approaching object is on a straight-line path to the right camera, then that camera will see no horizontal motion (i.e., no displacement in the X direction), but will instead only see that the approaching object is becoming larger. The left camera will see the object getting larger as well, but it will also see the object displace to the right as it approaches. In this aspect, the horizontal displacement is zero for the right camera and some non-zero positive number for the left camera. If the object was approaching to the right of the right camera, then the left camera would still see a greater horizontal displacement than the right camera. This difference in horizontal displacement locates the object in the horizontal plane and the difference vertically locates it in the vertical plane. The combination of the changes in vertical and horizontal indicates the object's path, and the instantaneous result is its actual position. This technique uses the parallax method. See, e.g., Karl F. Kuhn & Theo Koupelis. In Quest Of The Universe (4th edition) which is incorporated herein in its entirety by reference. Other information may be used to complement the "stereo-derived" information using the parallax method. For example, in one aspect, assumptions are made about the size of the object, (i.e., a commercial UAS ranges between 12 inches and 24 inches in height and some similar measurement wide) the system can estimate its distance approximately, and its change in permits an estimate of its forward velocity. This method can be referred to as stereopsis. See, e.g., Howard I P, Rogers B J (1995). Binocular Vision and Stereopsis. New York: Oxford University Press and Howard I P, Rogers B J (2012), Perceiving in Depth, Volume 3. New York: Oxford University Press which are both incorporated herein by reference in their entireties.

In one aspect of the technology, client computer(s)/devices and server computer(s) provide processing, storage, and input/output devices executing application programs and the like for use of the methods and processes described herein. Client computer(s)/devices can also be linked through communications network to other computing devices, including other client devices/processes and server computer(s). Communications network can be part of a remote access network, a global network (e.g., the Internet), a worldwide collection of computers, local area or wide area networks, and gateways that currently use respective protocols (TCP/IP, Bluetooth, etc.) to communicate with one another. Other electronic device/computer network architectures are suitable.

In accordance with one aspect, a computer can contain a system bus, where a bus is a set of hardware lines used for data transfer among the components of a computer or processing system. The bus is essentially a shared conduit that connects different elements of a computer system (e.g., processor, disk storage, memory, input/output ports, network ports, etc.) that enables the transfer of information between the elements. Attached to the system bus is an I/O device interface for connecting various input and output devices (e.g., keyboard, mouse, displays, printers, speakers, etc.) to the computer. A network interface allows the computer to connect to various other devices attached to a network. A memory provides volatile storage for computer software instructions and data used to implement an embodiment of the present disclosure (e.g., code detailed above). A disk storage provides non-volatile storage for computer software instructions and data used to implement an embodiment of the present disclosure. A central processor unit is also attached to the system bus and provides for the execution of computer instructions.

In one embodiment, the processor routines and data are a computer program product, including a computer readable medium (e.g., a removable storage medium such as one or more DVD-ROM's, CD-ROM's, diskettes, tapes, etc.) that provides at least a portion of the software instructions for the system. A computer program product can be installed by any suitable software installation procedure, as is well known in the art. In another aspect, at least a portion of the software instructions can also be downloaded over a cable, communication and/or wireless connection. In other aspects, the programs comprise a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present technology. In alternate aspects, the propagated signal can comprise an analog carrier wave or digital signal carried on the propagated medium. For example, the propagated signal can be a digitized signal propagated over a global network (e.g., the Internet), a telecommunications network, or other network. In one embodiment, the propagated signal can comprise a signal that is transmitted over the propagation medium over a period of time, such as the instructions for a software application sent in packets over a network over a period of milliseconds, seconds, minutes, or longer. In another embodiment, the computer readable medium of computer program product can be a propagation medium that the computer system can receive and read, such as by receiving the propagation medium and identifying a propagated signal embodied in the propagation medium, as described above for computer program propagated signal product. Generally speaking, the term "carrier medium" or transient carrier encompasses the foregoing transient signals, propagated signals, propagated medium, storage medium and the like.

Figure 5:
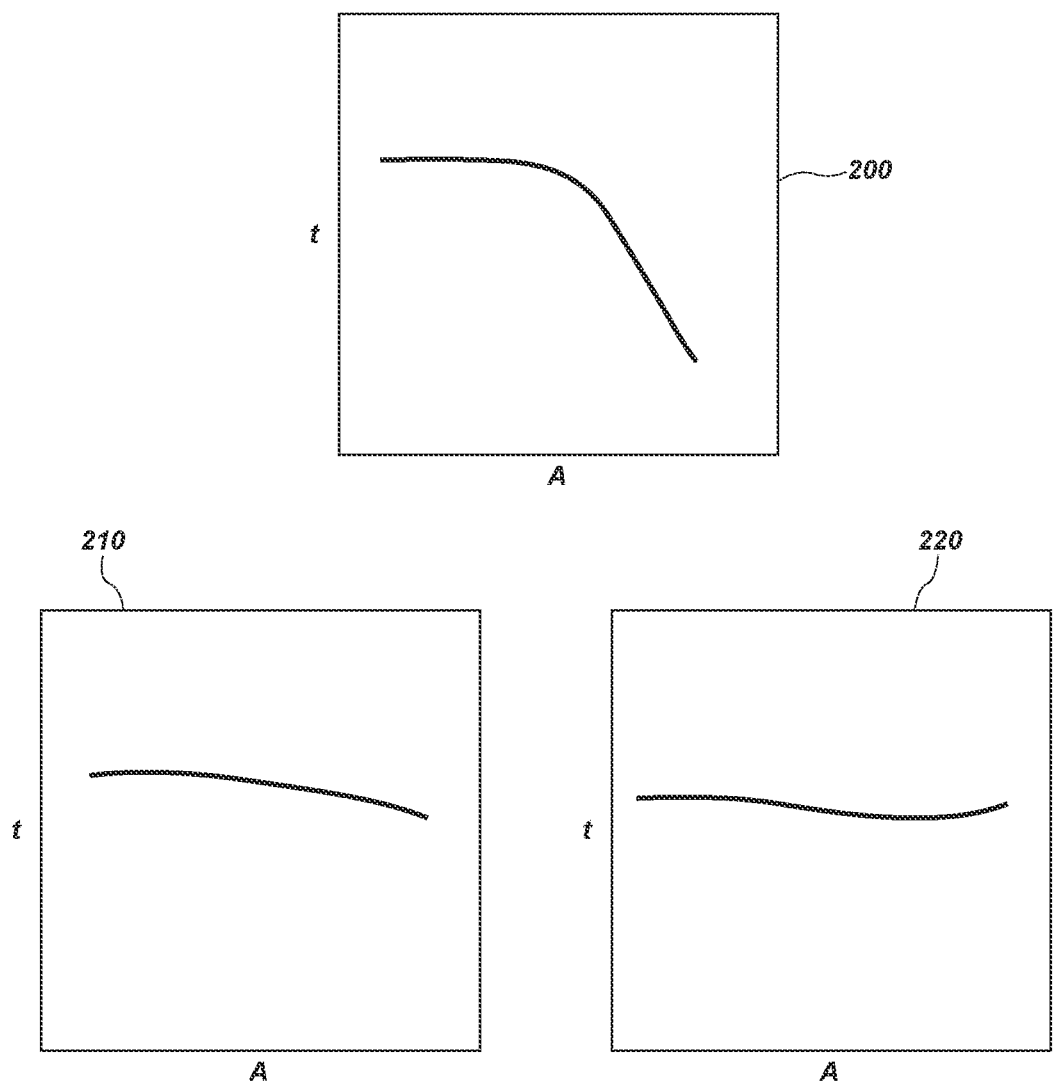
FIG. 5 is a plurality of diagrams illustrating aspects of the technology.

In one aspect of the technology, datasets of baseline data related to target observations are collected and a profile of target characteristics is generated once the target is classified. For example, a profile of a known target might include the target's speed and trajectory under different normal weather conditions. FIG. 5 illustrates a graphical representation of a generic profile 200 generated for a microscopically detected change (delta) over time (t) of a target. A graphical representation of a baseline profile (i.e., an aggregation of historical data) for the same known target (e.g., a goose) is shown on 210. A graphical representation of an aggregate known target profile is presented at 220. In each representation, the change (delta) of the same microscopically detected change (e.g., wing beat) over the same time period is presented.

In one aspect, aggregation includes normalization of a dataset limited by user-selected categories. Given a finite set of observable geometric variations from a great distance, datasets can be grouped in categories. Non-limiting example categories include trajectory, speed, frequency of movement of lateral portions of the target (i.e., the wings), heat signature, response to artificially induced environmental influences, and the like. Aggregated groups can further be grouped into subclasses as suits a particular analysis. In one non-limiting example, an aggregate profile is generated for wing beat frequency of a goose during winter months. The aggregate profile can be used as a baseline comparison for a specific target observed during the same winter months to determine the target's deviation from or similarity to the aggregate profile. In each category, and where possible, data is sorted by timeline. Once a comparison has been made between an aggregate profile and a specific target profile, the aggregate profile can be amended to include the data of the specific target profile.

Figure 4:
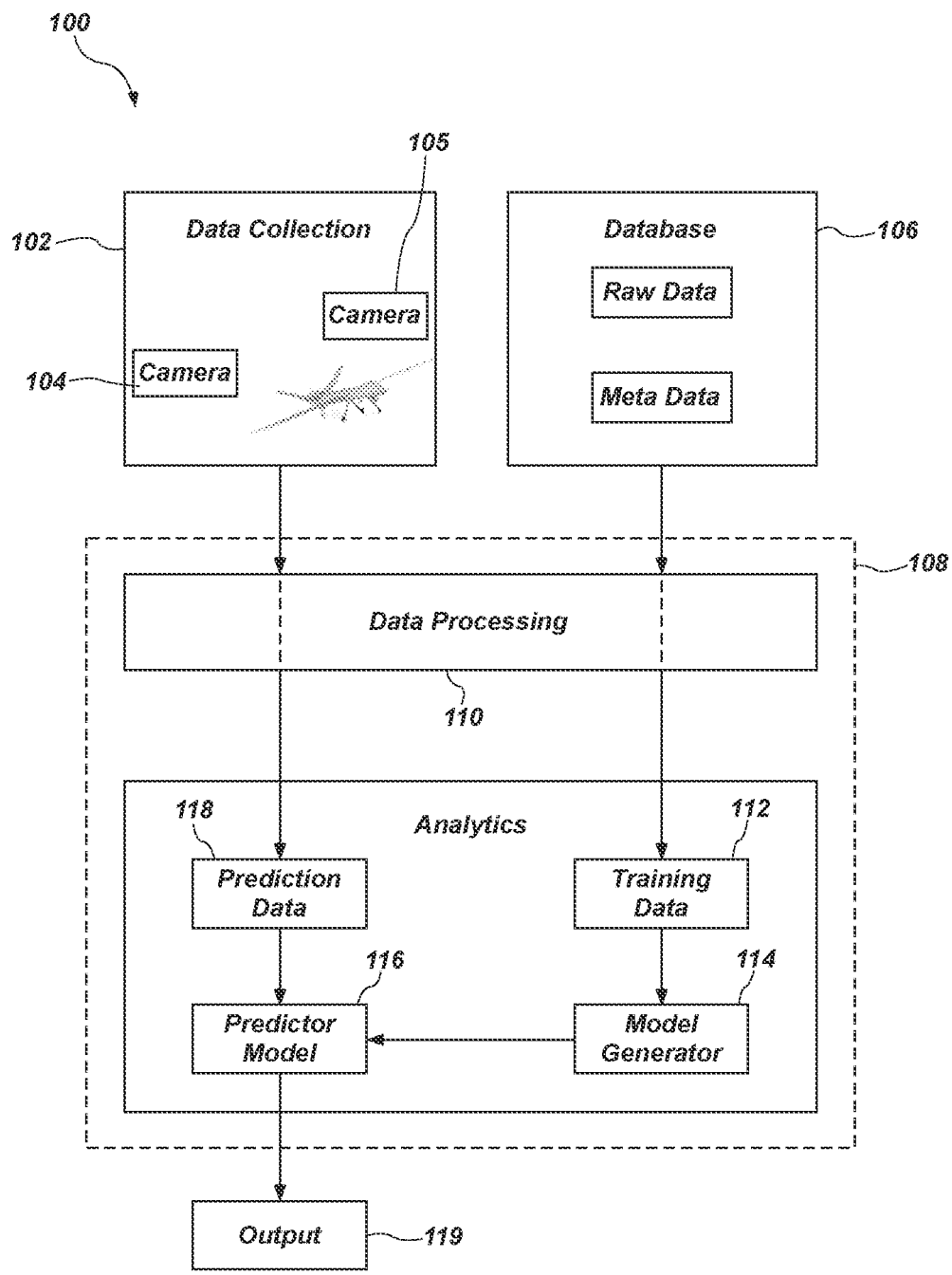
FIG. 4 is a flow chart illustrating aspects of the technology.

With reference to FIG. 4, a generalized architecture for the present technology includes a system 100 for analyzing microscopic temporal variations of geometric conditions for classification of the target (i.e., a UAV or bird). Starting at box 102, one or more camera devices 104, 105 are configured to capture images containing microscopic temporal variations in geometry of the target. Each of the camera devices 104, 105 generates images comprising a time series of image values.

Following the branch to the right of box 102, the output signals of camera devices 104, 105 can be sent to and stored in a memory component to create an archival database 106. Database 106 can house measurements of known or predicted information regarding targets. For example, known propeller rotation rates, wing beat rates, predicted behavior based on environmental influences, etc. Database 106 can decode and store a segment of the raw data representing the signal from one or more cameras 104, 105 and meta data which can include information regarding the data collection system such as type, manufacturer, model, sensor ID, sampling frequency, date, and the like. One or more data segments of interest are communicated to a processor represented at 108. The processor 108 is a computing device configured to obtain data generated by the camera devices 104, 105 and to perform calculations based on the obtained data. In one embodiment, the computing device can include at least one processor 108, an interface for coupling the computing device to the database 106, and a nontransitory computer-readable medium. The computer-readable medium can have computer-executable instructions stored thereon that, in response to execution by the processor 108, cause the processor 108 to perform the described calculations on the obtained data. One example of a suitable computing device is a personal computer specifically programmed to perform the actions described herein. This example should not be taken as limiting, as any suitable computing device, such as a laptop computer, a smartphone, a tablet computer, a cloud computing platform, an embedded device, and the like, can be used in various embodiments of the present disclosure.

With reference again to FIG. 4, as described in more detail below, the time segment of archived data is preprocessed (box 110) to a form for further analyzing in accordance with the technology. The result is an altered dataset which can be referred to as "training data" (box 112) or "baseline data" retrieved from the target itself. The training data is used to create a model that indicates the correlation between the camera data from the archive and a classification of the target. In FIG. 4, model generation is represented at 114 and the resulting model stored in the computing device is represented at 116. Returning to box 102, once the model 116 has been generated, the camera devices 104 or 105 can be coupled to the processor 108 by a real-time connection, such as by a serial cable, a USB cable, a local network connection, such as a Bluetooth connection, a wired local-area network connection, a WIFI connection, an infrared connection, and the like. In another embodiment, the camera devices 104, 105 can be coupled to the processor 108 by a wide area network, such as the Internet, a WiMAX network, a 3G, 4G, or 5G network, a GSM network, and the like. The camera devices 104, 105 can each include network interface components that couple each camera device 104, 105 to the processor 108. Alternatively, the camera devices 104, 105 can each be coupled to a shared networking device via a direct physical connection or a local network connection, which in turn establishes a connection to the processor 108 over a wide area network.

In one aspect of the technology, the correlation of the measured temporal variations in the target with the classification of the target (e.g., UAV or bird) can be established by a multiple regression analysis. For the analysis, let Y represent a dependent or criterion variable indicative of the temporal variation of interest, and let X1, X2, X3, . . . , Xn represent independent or predictor variables (i.e., the data derived from the sensor or sensors) of Y. An observation of Y coupled with observations of the independent variables Xi is a case or a run of an experiment. Typically observations of values for any given variable will form a continuous, totally-ordered set. In cases where a variable is categorical or probabilistic (such as a 0 or 1 representing presence or absence or a medical condition) a logistic function is used to represent the regression model. In experimental runs, score values of these variables are observed from a population. It is assumed that any dataset used is a sample from a population or large group. Regression is used to predict time series values of the dependent variable Y based on time series data of the independent variable X. Ideally, time series data for X will be sampled at regular intervals and will be represented by the Xi. Time series data for the dependent variable Y need not be sampled regularly. Observations of Yi and Xi will be made over a time period $0<t<T$. Causality is assumed, and if Yt exists, Xt, Xt−1, 4t−2, Xt−3, . . . X0 can be used in a multiple regression to predict it.

In accordance with one aspect of the technology, the predictor temporal variation can be sampled to obtain N samples between time t-N and time t. A spectral analysis (FFT in an exemplary embodiment) can be used to obtain the waveform frequency components which are used in the multiple regression analysis. Another variable for the multiple regression analysis is an indicator of the state of the subject at time t. This can be a binary indicator of a temporal variation (i.e., propeller rotation) indicating that the target is likely a UAV or not. The various observations can be used in the multiple regression to set the values of the various coefficients of the predictors in the linear function. The predictor values are the spectral components of the predictor signal. The result is the model that will reside in the processor. The processor derives the time lagged, spectrum analyzed predictor data signal from data processed from the camera device and uses the processor and the model to provide the output that indicates the prediction of the classification of the target. As distributed time-lagged regression is performed on the data, the time scales of the alleged correlations between the two waveforms can be much longer than their sampling frequencies, and it can be desirable to manage the number of predictors. The predictors need to cover the time-lag region in which the suspected correlation is in place.

It is believed that use of spectral information (e.g., FFT) requires the use of many predictors in the model for the bandwidths of signals in use. However, multiple regression often benefits when less predictors can be used. The goal of reducing the independent variable set can be achieved when representative predictors are used, and when predictors can be placed in groups with similar characteristics. The placement of predictors into similar groups (i.e., subclasses of aggregate datasets) in the present technology can be achieved by the use of a clustering algorithm. Clustering algorithm group sets of observations, usually according to a parameter k representing the desired number of clusters to be found by the algorithm. Hierarchical clustering algorithms solve the clustering problem for all values of k using bottom up and top down methods. One suitable hierarchical clustering algorithm for use in the present disclosure is called AGNES (see L. Kaufman and P. J. Rousseeuw. Finding Groups in Data, An Introduction to Cluster Analysis, Hoboken, N.J., Wiley-Interscience, 2005, which is hereby expressly incorporated by reference herein) to cluster the spectral predictors based on three criteria obtained from a multiple regression performed on the FFT coefficients. As measures of similarity used in clustering, these criteria are the FFT index, the regression coefficient estimates themselves, and the regression coefficient t values.

The temporal variations discussed herein that are analyzed are not limited to a comparison of two images adjacent in time for the classification. Rather, the system is configured for constant evaluation of images of an unknown target according to a user-specified grouping of images. In one aspect, the user can select a time period and number of images to be input into the amplification system. The system then constantly monitors any unknown target according to the user-entered criteria.

In one aspect of the technology, the system described herein to identify a non-biological aerial entity is coupled to a countermeasure system. The countermeasure system can be land, sea, air, or space-based. It can be geographically proximate to the camera systems or geographically remote. In one aspect, the countermeasure system comprises a projectile (e.g., missile, bullet, etc.) that can be launched or shot at a target for disabling it. In another aspect, the countermeasure system comprises a laser or laser-guided projectile. In yet another aspect, the countermeasure system comprises a UAV or other aerial vehicle configured to capture the target.

The foregoing detailed description describes the technology with reference to specific exemplary aspects. However, it will be appreciated that various modifications and changes can be made without departing from the scope of the present technology as set forth in the claims. The detailed description and accompanying drawings are to be regarded as merely illustrative, rather than as restrictive, and all such modifications or changes, if any, are intended to fall within the scope of the present technology as described and set forth herein.

More specifically, while illustrative exemplary aspects of the technology have been described herein, the present technology is not limited to these aspects, but includes any and all aspects having modifications, omissions, combinations (e.g., of aspects across various aspects), adaptations and/or alterations as would be appreciated by those skilled in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims can be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus-function are expressly recited in the description herein. Accordingly, the scope of the technology should be determined solely by the claims and their legal equivalents, rather than by the descriptions and examples given above.

The invention claimed is:

1. A method of classifying a distant unknown target, comprising:
scanning a predetermined area of an aerial landscape with one or more cameras for an airborne target;
capturing a plurality of images of the airborne target with the one or more cameras, the one or more cameras in communication with a processor;
amplifying microscopic temporal variations between the plurality of images of the airborne target in the frequency range of 400 nm to 700 nm, wherein the at least one microscopic temporally detected variation comprises a change in the geometry of a two-dimensional image of the airborne target;
after detecting a change in the geometry of the image of the airborne target, detecting an intensity value of the airborne target in the frequency range of 700 nm to 1100 nm; and
comparing the intensity value of the airborne target to a profile of intensity values of known airborne biological or non-biological subjects to determine if the airborne target is a known biological subject or non-biological subject.

2. The method of claim 1, further comprising:
generating a profile of a rate of change of at least one microscopic temporally detected variation of the geometry of the two-dimensional image of the target;
comparing the profile of the target to a pre-existing aggregate profile of a plurality of known airborne biological or non-biological subjects, the aggregate profile corresponding to the at least one microscopic temporally detected variation of geometry of the two-dimensional image of the known airborne biological or non-biological subjects; and
detecting differences between the profile of the airborne target and the aggregate profile of the plurality of known targets and determining a probability that the airborne target is one of the known targets.

3. The method of claim 2, further comprising:
implementing defensive countermeasures if the probability that the airborne target is a non-biological subject exceeds a predetermined value.

4. The method of claim 3, wherein the predetermined value is greater than 50 percent.

5. The method of claim 3, wherein the defensive countermeasures comprises one or more of: propagating a jamming signal towards the airborne target, launching a missile towards the airborne target, launching a system for capturing the airborne target, and/or shooting the airborne target, or disabling it by other means.

6. A system configured to classify a moving airborne target, comprising:
a camera in communication with one or more processors;
one or more memories operatively coupled to at least one of the one or more processors and having instructions stored thereon that, when executed by at least one of the one or more processors, cause the system to:
capture a plurality of images of the moving airborne target, the images being captured in a frequency of light in a first band ranging from 400 nm to 700 nm and a second band ranging from 700 nm to 1100 nm;
amplify microscopic temporal variations between the plurality of images of the target and generate a profile of a rate of change of at least one microscopic temporally detected variation of the geometry of the two-dimensional image of the target in the first band; and
measure a color intensity value of the moving airborne target based on the images of the airborne target captured in the second band and compare the color intensity value to a profile of known color intensity values corresponding to airborne biological and non-biological subjects.

7. The system of claim 6, the one or more memories further comprising instructions stored thereon that, when executed by at least one of the one or more processors, cause the system to compare the profile of the subject to a pre-existing aggregate profile of a plurality of known mobile biological or non-biological subjects, the aggregate profile corresponding to the at least one microscopic temporally detected variation of geometry of the two-dimensional image of the known mobile biological or non-biological targets, and detect differences between the profile of the moving airborne target and the aggregate profile of the plurality of known targets, and determine a probability that the moving airborne target is one of the known targets.

8. The system of claim 6, further comprising a transmitter configured to propagate a radio signal directed at the moving airborne target.

9. The system of claim 8, wherein the camera and transmitter are mounted to an unmanned aerial vehicle.

10. The system of claim 8, the one or more memories further comprising instructions stored thereon that, when executed by at least one of the one or more processors, cause the system to detect differences between the profile of the moving airborne target subjected to the radio signal and an aggregate profile of a plurality of known subjects subjected to a radio signal and determine a probability that the moving airborne target is one of the known targets.

11. The system of claim 6, further comprising a projectile configured to generate a percussive signal directed at the moving airborne target.

12. The system of claim 8, wherein the camera and projectile are mounted to an unmanned aerial vehicle.

13. The system of claim 8, the one or more memories further comprising instructions stored thereon that, when executed by at least one of the one or more processors, cause the system to detect differences between the profile of the moving airborne target subjected to the percussive signal and an aggregate profile of a plurality of known subjects subjected to a percussive signal and determine a probability that the moving airborne target is one of the known targets.

14. The system of claim 6, wherein the camera is configured to detect a first band of wavelengths of light ranging from approximately 150 to 400 nm, a second band of wavelengths of light ranging from approximately 400 to 700 nm and a third band of wavelengths of light ranging from approximately 700 to 1100 nm.

15. The system of claim 6, wherein the system comprises a plurality of cameras disposed apart from one another each with a different field of view, and each configured to communicate with the processor, wherein a field of view of each of the plurality of cameras overlaps with a field of view of at least one other of the plurality of cameras, and wherein each of the cameras is configured to capture a plurality of images of the moving airborne target.

16. The system of claim 15, the one or more memories further comprising instructions stored thereon that, when executed by at least one of the one or more processors, cause the system to amplify microscopic temporal variations between the plurality of images of the target from each of the different cameras and generate a profile of a rate of change of at least one microscopic temporally detected variation of the geometry of the two-dimensional target from each of the cameras, wherein the at least one microscopic temporally detected variation of geometry comprises a variation in the geometry of the moving target.

17. The system of claim 15, wherein the variation in the two-dimensional geometry of the moving target for each camera is different.

18. The system of claim 15, the one or more memories further comprising instructions stored thereon that, when executed by at least one of the one or more processors, cause the system to determine a direction of travel of the moving target based on the variation in the two-dimensional geometry of the image of the moving target from each of the plurality of cameras.

19. The system of claim 15, the one or more memories further comprising instructions stored thereon that, when executed by at least one of the one or more processors, cause the system to determine a speed of travel of the moving target based on the variation in the two-dimensional geometry of the moving target from each of the plurality of cameras.

20. A system configured to classify a moving airborne target, comprising:
a camera in communication with one or more processors;
one or more memories operatively coupled to at least one of the one or more processors and having instructions stored thereon that, when executed by at least one of the one or more processors, cause the system to:
capture a plurality of images of the moving airborne target and amplify microscopic temporal variations between the plurality of images of the target and generate a profile of the at least one microscopic temporally detected variation of the two-dimensional geometry of the image of the target; wherein the at least one microscopic temporally detected variation of the two-dimensional geometry comprises a vertical variation in the two-dimensional geometry of the moving target.

21. The system of claim 20, wherein the at least one microscopic temporally detected variation comprises a frequency of a vertical variation in the two-dimensional geometry of the image of the moving target.

22. The system of claim 20, the one or more memories further comprising instructions stored thereon that, when executed by at least one of the one or more processors, cause the system to approximate a centroid of the image of the moving target.

23. The system of claim 20, the one or more memories further comprising instructions stored thereon that, when executed by at least one of the one or more processors, cause the system to approximate a top edge and bottom edge of the image of the moving target.

24. The system of claim 20, the one or more memories further comprising instructions stored thereon that, when executed by at least one of the one or more processors, cause the system to approximate lateral sides of the image of the moving target.

25. The system of claim 20, wherein the plurality of images comprise a plurality of infrared images and the at least one microscopic temporally detected variation of the two-dimensional geometry of the image is detected by evaluating the intensity of color from the infrared images of the moving target.

26. The system of claim 20, wherein the camera is mounted to an unmanned aerial vehicle.

27. The system of claim 20, wherein the camera is mounted to a stationary structure.

28. A system configured to classify a moving airborne target, comprising:
a camera in communication with one or more processors;
one or more memories operatively coupled to at least one of the one or more processors and having instructions stored thereon that, when executed by at least one of the one or more processors, cause the system to capture a plurality of images of the moving airborne target and amplify microscopic temporal variations between the plurality of images of the target and generate a profile of the at least one microscopic temporally detected variation of the two-dimensional geometry of the image of the target; wherein the at least one microscopic temporally detected variation of the two-dimensional geometry of the image of the target comprises a variation in the frequency of change of the two-dimensional geometry of the moving target.

29. One or more computer readable media, comprising:
one or more non-transitory computer-readable media storing instructions, wherein the instructions, when executed by one or more computing devices, cause at least one of the one or more computing devices to:
scan a predetermined area of an aerial landscape for an airborne target;
capture a plurality of images of the airborne target;
amplify microscopic temporal variations between the plurality of images of the airborne target in the frequency range of 400 nm to 700 nm, wherein the at least one microscopic temporally detected variation comprises a change in the geometry of a two-dimensional image of the airborne target;
after detecting a change in the geometry of the image of the airborne target, detect an intensity value of the airborne target in the frequency range of 700 nm to 1100 nm; and
compare the intensity value of the airborne target to a profile of intensity values of known airborne biological or non-biological subjects to determine if the airborne target is a known biological subject or non-biological subject.

30. The one or more computer-readable media of claim 29, wherein the stored instructions, when executed by one or more computing devices, cause at least one of the one or more computing devices to generate a profile of a rate of change of at least one microscopic temporally detected variation of the geometry of the two-dimensional image of the target; compare the profile of the target to a pre-existing aggregate profile of a plurality of known airborne biological or non-biological subjects, the aggregate profile corresponding to the at least one microscopic temporally detected variation of geometry of the two-dimensional image of the known airborne biological or non-biological subjects; and detect differences between the profile of the airborne target and the aggregate profile of the plurality of known targets and determining a probability that the airborne target is one of the known targets.

31. A method of classifying a distant unknown target, comprising:
scanning a predetermined area of an aerial landscape with one or more cameras for an airborne target;

capturing a plurality of images of the airborne target with the one or more cameras, the one or more cameras in communication with a processor;

amplifying microscopic temporal variations between the plurality of images of the airborne target in the frequency range of 400 nm to 700 nm, wherein the at least one microscopic temporally detected variation comprises a change in the geometry of a two-dimensional image of the airborne target;

after detecting a change in the geometry of the image of the airborne target, detecting an intensity value of the airborne target in the frequency range of 700 nm to 1100 nm;

generating a profile of a rate of change of at least one microscopic temporally detected variation of the geometry of the two-dimensional image of the target;

comparing the profile of the target to a pre-existing aggregate profile of a plurality of known airborne biological or non-biological subjects, the aggregate profile corresponding to the at least one microscopic temporally detected variation of geometry of the two-dimensional image of the known airborne biological or non-biological subjects; and detecting differences between the profile of the airborne target and the aggregate profile of the plurality of known targets and determining a probability that the airborne target is one of the known targets.

32. One or more computer readable media, comprising:

one or more non-transitory computer-readable media storing instructions, wherein the instructions, when executed by one or more computing devices, cause at least one of the one or more computing devices to:

scan a predetermined area of an aerial landscape for an airborne target;

capture a plurality of images of the airborne target;

amplify microscopic temporal variations between the plurality of images of the airborne target in the frequency range of 400 nm to 700 nm, wherein the at least one microscopic temporally detected variation comprises a change in the geometry of a two-dimensional image of the airborne target;

after detecting a change in the geometry of the image of the airborne target, detect an intensity value of the airborne target in the frequency range of 700 nm to 1100 nm;

generate a profile of a rate of change of at least one microscopic temporally detected variation of the geometry of the two-dimensional image of the target;

compare the profile of the target to a pre-existing aggregate profile of a plurality of known airborne biological or non-biological subjects, the aggregate profile corresponding to the at least one microscopic temporally detected variation of geometry of the two-dimensional image of the known airborne biological or non-biological subjects; and detect differences between the profile of the airborne target and the aggregate profile of the plurality of known targets and determining a probability that the airborne target is one of the known targets.

\* \* \* \* \*